US012460643B2

(12) United States Patent
Simross

(10) Patent No.: US 12,460,643 B2
(45) Date of Patent: Nov. 4, 2025

(54) DRY-COMPRESSION COMPRESSOR AND METHOD FOR OIL SEPARATION FOR A DRY-COMPRESSION COMPRESSOR

(71) Applicant: KAESER KOMPRESSOREN SE, Coburg (DE)

(72) Inventor: Dirk Simross, Coburg (DE)

(73) Assignee: KAESER KOMPRESSOREN SE, Coburg (DE)

( * ) Notice: Subject to any disclaimer, the term of this patent is extended or adjusted under 35 U.S.C. 154(b) by 0 days.

(21) Appl. No.: 18/573,132

(22) PCT Filed: Jun. 27, 2022

(86) PCT No.: PCT/EP2022/067498
§ 371 (c)(1),
(2) Date: Dec. 21, 2023

(87) PCT Pub. No.: WO2023/274919
PCT Pub. Date: Jan. 5, 2023

(65) Prior Publication Data

US 2024/0229794 A1 Jul. 11, 2024

(30) Foreign Application Priority Data

Jun. 30, 2021 (DE) ..................... 10 2021 116 925.9

(51) Int. Cl.
*F04C 29/00* (2006.01)
*F04C 18/16* (2006.01)
(Continued)

(52) U.S. Cl.
CPC ............ *F04C 29/026* (2013.01); *F04C 18/16* (2013.01); *F04C 27/00* (2013.01); *F04C 27/02* (2013.01); *F04C 29/028* (2013.01); *F16J 15/002* (2013.01)

(58) Field of Classification Search
CPC .... F04C 29/026; F04C 29/028; F04C 19/005; F04C 19/00; F04C 18/16; F04C 27/00; F04C 27/02; F04C 27/009
See application file for complete search history.

(56) References Cited

U.S. PATENT DOCUMENTS 4,993,930 A * 2/1991 Uchida .................... F16J 15/40 418/104
6,612,820 B1 9/2003 Staat et al.
(Continued)

FOREIGN PATENT DOCUMENTS

EP 0674751 A1 10/1995
EP 0719910 A1 7/1996
(Continued)

OTHER PUBLICATIONS

English translation of JP6826512 by PE2E Mar. 29, 2025.*
International Search Report and Written Opinion corresponding to PCT/EP2022/067498; Dated Oct. 10, 2022 (19 pages).

*Primary Examiner* — Deming Wan
(74) *Attorney, Agent, or Firm* — Myers Bigel, P.A.

(57) ABSTRACT

The invention relates to a dry-compressing or oil-free compressor for generating a compressed gas and a method for oil separation for a dry-compressing compressor (1). The compressor has a compressor housing (4), a compression chamber (5) and at least one oil chamber (19*a*, 19*b*), in which an oil-lubricated bearing (18*a*, 18*b*) of the rotor bearing (16) is accommodated, as well as a shaft seal arrangement (10*a*, 10*b*), which is arranged between the oil-lubricated bearing (18*a*, 18*b*) and the compression chamber (5). The shaft seal arrangement (10*a*, 10*b*) has an outer seal (17*a*, 17*b*) facing the oil-lubricated bearing (18*a*, 18*b*) and an inner seal (12*a*, 12*b*) facing the compression chamber (5), wherein at least one sealing gas chamber (13*a*, 13*b*, 13*c*, 13*d*) for receiving sealing gas is formed between the outer seal (17*a*, 17*b*) and
(Continued)

the inner seal (12*a,* 12*b*). The oil chamber (19*a,* 19*b*) has at least one gas inlet for a sealing gas flow from the sealing gas chamber (13*a,* 13*b,* 13*c,* 13*d*) and a gas outlet (26) for connection to an oil separator (30, 31, 32, 33). The oil chamber (19*a,* 19*b*) provides an oil chamber pressure $p_{OR}$ that exceeds the ambient pressure $p_0$ of the compressor housing (4) by an oil separation pressure difference Δp.

20 Claims, 5 Drawing Sheets

(51) Int. Cl.

| | |
|---|---|
| ***F04C 27/00*** | (2006.01) |
| ***F04C 27/02*** | (2006.01) |
| ***F04C 29/02*** | (2006.01) |
| ***F16J 15/00*** | (2006.01) |

(56) References Cited

U.S. PATENT DOCUMENTS 8,512,019 B2 * 8/2013 Kakiuchi ................ F04C 29/02 418/98
10,480,713 B2 * 11/2019 Kato ....................... F01D 25/18
2012/0230857 A1 * 9/2012 Noguchi ............... F01C 19/125 418/201.1
2016/0146352 A1 5/2016 Juchymenko

FOREIGN PATENT DOCUMENTS

EP 1447566 A1 8/2004
EP 1975410 A1 10/2008
EP 2896834 A1 7/2015
EP 3453880 A1 3/2019
FR 2569780 A1 3/1986
JP 6826512 B2 * 2/2021 .............. F04C 18/16

* cited by examiner

DRY-COMPRESSION COMPRESSOR AND METHOD FOR OIL SEPARATION FOR A DRY-COMPRESSION COMPRESSOR

CROSS-REFERENCE TO RELATED APPLICATION

This application is a 35 U.S.C. § 371 national stage application of PCT Application No. PCT/EP2022/067498, filed Jun. 27, 2022, the contents of which are incorporated herein by reference in its entirety. The above-referenced PCT International Application was published in the German language as International Publication No. WO 2023/274919 A1 on Jan. 5, 2023.

FIELD

The invention relates to a dry-compressing compressor for generating a compressed gas, in particular compressed air, and to a method of oil separation for such a dry-compressing compressor.

BACKGROUND

Dry-compressing or oil-free compressors are primarily used for applications in which the provision of oil-free compressed process gas, in particular oil-free compressed air, is important, such as in the food or pharmaceutical industries. Unlike oil-lubricated or oil-injected compressors, dry-compressing compressors do not allow oil to enter the compression chamber or the compressed gas produced. However, oil lubrication is often provided for the shaft bearings of the compressor rotors.

Due to the high rotational speeds of the compressor rotors, high circumferential speeds of the shaft occur at the shaft seals. For this reason, non-contact seals are typically used. Non-contact seals naturally have a certain amount of leakage. In addition to the undesirable loss of gas to be compressed from the compression chamber, sealing against oil ingress (or ingress of grease particles in the case of grease lubrication of the bearings) from the bearing area into the compression chamber is also desirable in order to prevent contamination of the gas to be compressed.

Dry-compressing compressors in which sealing air is used for sealing are known from FR 2 569 780 A1, EP 0 674 751 A1 and EP 1 975 410 A1.

Dry-compressing compressors known from the prior art have several disadvantages.

If the compressor can be operated in idle mode, the intake throttling by the inlet valve in the compression chamber can create a vacuum on the intake side, so that gas contaminated with oil and/or grease can be drawn into the compression chamber through the (leaking) shaft seals. In addition, impurities from the environment can be sucked in through existing drainage openings in the shaft seals, which can reach the process gas or compressed air and damage the shaft seals. During load operation, the pressure gradient can cause leakage flows to enter the environment via drainage openings or lanterns in the shaft seals, which may contain contaminants from lubricants such as oil or grease.

Due to the inherent leakage of the shaft seals, a leakage gas flow can reach the area of the oil-lubricated bearings, wherein the gas or air escaping from the shaft seal is contaminated with oil. In many dry-compressing compressors, this oil-air mixture (oil mist) enters the environment through openings in the compressor housing, contaminating it with oil. In addition, escaping oil aerosols can flow into the intake area of the compressor and thus impair the quality of the compressed air produced. The pressure level in the bearing area of these compressors is at the ambient pressure level.

The oil mist extraction systems sometimes used are complex and prone to failure. If oil separators are used at all in the prior art for cleaning contaminated air that escapes, they require the use of additional energy to lower the pressure level on the outflow side of the oil separator, for example via an ejector nozzle (vacuum suction nozzle) operated with compressed air or via an electrically driven suction system. Ejector nozzles can also lead to a reduction in the amount of compressed air supplied and, if clogged with impurities, to malfunctions in the operation of the compressor.

A rotary piston machine having a centrifuge for generating a vacuum in an oil chamber is known from EP 1 447 566 A1.

An oil-free compressor having a suction pump in the form of an ejector is known from EP 0 719 910 A1.

Based on this prior art, the invention has, on the one hand, the object of providing a compressed gas, in particular compressed air, of high quality, in particular for various operating states of the compressor, and, on the other hand, of avoiding contamination of the environment with lubricant, in particular oil. In particular, the aim is to achieve the most thorough, simple and energy-efficient cleaning possible of air flows emerging from the shaft seals and contaminated by the bearing lubrication.

This object may be solved in each case by a dry-compressing compressor embodiments of the invention.

SUMMARY

In particular, the object is solved by a dry-compressing compressor for generating a compressed gas, in particular for generating compressed air, having one or more compressor stages, comprising

- a compressor housing,
- at least one compressor rotor, which is rotatably mounted in relation to the compressor housing via a rotor bearing,
- wherein the compressor housing comprises
  - a compression chamber for compressing gas drawn in by the compressor rotor and
  - at least one oil chamber, in which at least one oil-lubricated bearing of the rotor bearing for mounting a shaft section of the compressor rotor is accommodated,
- a shaft seal arrangement assigned to the shaft section, which is arranged between the oil-lubricated bearing and the compression chamber to seal the compression chamber against oil ingress from the oil chamber,
- wherein the shaft seal arrangement has an outer seal facing the oil-lubricated bearing, in particular without contact, and an inner seal facing the compression chamber, in particular without contact, wherein a sealing gas chamber for accommodating sealing gas is formed between the outer seal and the inner seal, wherein the oil chamber has at least one gas inlet for a sealing gas flow from the sealing gas chamber and a gas outlet for connection to an oil separator, in particular an oil mist separator, and wherein the oil chamber is designed to provide an oil chamber pressure $p_{OR}$ which exceeds the ambient pressure $p_0$ of the compressor housing by an oil separation pressure difference $\Delta p$, which is preferably at least 20 mbar ($2\times10^3$ Pa).

The invention is based on the idea of generating an overpressure in the oil chamber compared to the environment by means of the sealing gas flow flowing into the oil chamber, which can be used for oil separation.

According to one idea of the invention, it is preferably possible to dispense with lowering the pressure on the outflow side of the oil separator, although an additional lowering of the pressure level on the outflow side of the oil separator is not ruled out. The oil chamber pressure generated is preferably sufficiently high to overcome a pressure difference to be overcome for the flow through an oil separator, in particular an oil mist separator, which can be referred to as the oil separation pressure difference. The oil separation pressure difference Δp can be understood as an overpressure in the oil chamber compared to the pressure $p_0$ in the surroundings of the compressor housing (ambient pressure of the compressor housing). The ambient pressure of the compressor housing can correspond to the intake pressure of the compressor, especially if the compressed gas is a process gas (i.e. not air), wherein a purified process gas flow is preferably fed back into the intake area of the compressor. The oil separation pressure difference Δp is in particular sufficiently large to (at least) overcome pressure losses between the oil chamber and the outflow side of an oil separator, comprising in particular line pressure losses and a separation pressure difference to be overcome in the oil separator, for example the pressure difference via at least one filter medium and/or flow pressure losses of a flow diverter for oil separation. The oil chamber pressure $p_{OR}$ can be understood as the sum of the ambient pressure $p_0$ of the compressor housing and the oil separation pressure difference Δp ($p_{OR}=p_0+\Delta p$). The pressure level $p_0$ of the ambient pressure of the compressor housing can prevail on the pressure side of an oil separator. On the one hand, oil separation is simplified due to the elimination of a suction device on the outflow side of the oil separator. This can also save energy. On the other hand, oil separators with a higher degree of separation can be used, which usually require a higher pressure difference for the flow (increased pressure loss). This enables more thorough cleaning of the escaping gas.

A preferred oil separation pressure difference Δp is over 20 mbar, further preferably over 50 mbar, further preferably over 100 mbar, further preferably over 150 mbar, further preferably about 200 mbar. An oil separation pressure difference Δp can be between 20 mbar and 1000 mbar (1 bar), preferably between 50 mbar and 500 mbar, more preferably between 100 mbar and 300 mbar, more preferably between 150 mbar and 250 mbar. Preferably, the oil separation pressure difference Δp is in the range of 150 mbar to 200 mbar, particularly preferably approx. 170 mbar.

A value for the oil separation pressure difference Δp refers in particular to a stationary (run-in) state of the oil separator. For example, the value (e.g. 20 mbar) of the oil separation pressure difference in the new condition of the oil separator (filter), e.g. for a few initial operating hours, can be significantly below the value (e.g. 170 mbar) in stationary operation, e.g. after more than 1000 operating hours.

It is known from the prior art that manufacturers of compressor housings specify the maximum permissible overpressure to which the shaft seals of the compressor housing may be subjected at approx. 2 mbar. Typical seals with delivery threads for the shaft passage in the compressor housing are designed, for example, for a pressure difference of up to approx. 0.5 mbar (5 mm water column). An oil chamber according to the invention, which provides an oil chamber pressure $p_{OR}$ that exceeds the ambient pressure $p_0$ of the compressor housing by an oil separation pressure difference Δp, clearly leads away from such known solutions.

Due to an oil separation pressure difference Δp of at least 20 mbar, oil separators with a higher separation efficiency, preferably finer (better) filters, can be used compared to the prior art, especially without pressure reduction on the outflow side of the oil separator.

As the oil chamber has an overpressure compared to the ambient pressure of the compressor housing and has a gas outlet for connection to an oil separator, an (uncontrolled) escape of the gas-oil mixture into the environment is prevented. On the one hand, this prevents contamination of the environment with oil and, on the other hand, prevents oil aerosols from being sucked in by the compressor. This in turn improves the quality of the compressed gas in terms of its purity.

In particular, the oil chamber is designed to be gas-tight (except for the gas outflow to the oil separator and leaks in the seals) with respect to the environment, wherein the sealing gas flow (or a leakage gas flow) flowing into the oil chamber can prevent the gas from flowing out of the oil chamber through the shaft seal arrangement (against the pressure difference generating the sealing gas flow). In particular, the oil chamber is designed to build up and maintain an oil chamber pressure and is therefore gas-tight with respect to the environment. A gas to be compressed can be a process gas, such as argon or nitrogen, or air, in particular ambient air.

The ambient pressure $p_0$ of the compressor housing can be understood as the pressure prevailing at a gas outlet downstream of an oil separator, at which the gas flow from which oil has been separated (i.e. the cleaned gas flow) exits into the environment of the compressor housing. The ambient pressure of the compressor housing is usually the atmospheric ambient air pressure. However, the ambient pressure of the compressor housing can deviate from the atmospheric ambient pressure, for example if the compressor is operated in a closed room with a different ambient pressure level (negative pressure or positive pressure compared to the atmosphere). The ambient pressure of the compressor housing can also correspond to the intake pressure of the compressor, in particular when compressing a process gas and returning the purified process gas flow to the intake area of the compressor. When compressing a process gas, the ambient pressure $p_0$ of the compressor housing can be independent of the atmospheric ambient pressure, in particular lower or higher than the atmospheric ambient pressure, wherein the oil chamber pressure $p_{OR}$ is set in particular as a function of the intake pressure of the compressor and the oil separation pressure difference Δp. The ambient pressure can depend on the altitude at which the compressor is operated. At an ambient pressure $p_0$ of 1 bar ($1\times10^5$ Pa), for example as an approximation for standard conditions, an oil separation pressure difference Δp of at least 20 mbar corresponds to at least 2% of the ambient pressure $p_0$. An (absolute) oil chamber pressure $p_{OR}$ would therefore be at least 1.02 bar (1020 mbar) in such a case. A preferred oil separation pressure difference Δp in the range of 200 mbar would correspond to an oil separation pressure difference Δp of approx. 20% at an ambient pressure $p_0$ of 1 bar.

A sealing gas chamber can be understood as an intermediate space of the shaft seal arrangement, in particular the space between an outer and an inner shaft seal. The sealing gas flow can originate from a leak in the shaft seal arrangement. The sealing gas flow can contain or consist of sealing gas supplied to the shaft seal arrangement, but can also contain compressed gas or gas to be compressed that has escaped from the compression chamber as a leakage gas flow, in particular due to possible mixing in the sealing gas chamber. The sealing gas flow of a sealing gas chamber can therefore originate from different sources, in particular from leaks from an (inner) shaft seal of the associated shaft seal arrangement, from leaks from other shaft seal arrangements, for example on the other side of the compressor (pressure or suction side), from shaft seal arrangements of a further compressor stage, or from sealing gas fed into the sealing gas chamber. In particular, an internal shaft seal has the task of sealing the compression chamber against gas ingress (e.g. during vacuum operation in idling mode) and gas egress (during overpressure operation in load operation).

An oil-lubricated bearing can also be understood as a grease-lubricated bearing or an oil and grease-lubricated bearing. This applies at least to the extent that a grease used for bearing lubrication can be regarded as an oil mixed with a binding agent. In particular, an oil mist is formed in the oil chamber, which is a mixture of oil (or grease) that has escaped from the oil-lubricated bearing and gas that has flowed into the oil chamber. The oil chamber can also be referred to as an oil mist chamber. An oil mist is preferably created at high rotational speeds and peripheral speeds, which can be more than 100 m/s, wherein oil droplets are finely atomized on impact. Floating oil droplets can be carried along by a gas flow and form an oil mist in the oil chamber.

A non-contact seal can be understood as a seal whose sealing elements (sealing surfaces) do not require contact for the purpose of sealing, but are preferably based on a flow-induced sealing effect. Non-contact seals in particular have a (narrow) sealing gap, which naturally allows a certain amount of leakage. Even with non-contact seals, however, there may be (slight) contact between the sealing elements, for example between a (metallic) inner sealing surface and the (coated) circumferential surface of a rotor shaft to be sealed. However, non-contact seals typically exhibit a sealing gap during operation, preferably after running-in, for example depending on the deflection of the shaft to be sealed, the thermal expansion and the wear of the coatings (of the seal and/or the shaft), at least in partial areas, which allows a leakage flow.

Several compressor stages can have a common compressor housing or separate compressor housings.

In particular, the gas outlet of the oil chamber is connected to at least one oil separator, in particular an oil mist separator. The oil separator can comprise several, similar or different, separation stages, in particular a pre-separator and/or a fine separator and/or a residual oil separator. Several oil separators, preferably fine separators, can be connected in series. The oil separator (oil mist separator) preferably comprises (at least) one coalescence filter. The gas outlet can be fluidically connected to the oil separator, for example via a cavity in the compressor housing or via one or more connection lines (directly or indirectly).

In addition, the object is solved in particular by a dry-compressing compressor for generating a compressed gas, in particular for generating compressed air, having one or more compressor stages, comprising

- a compressor housing,
- at least one compressor rotor, which is rotatably mounted in relation to the compressor housing via a rotor bearing,
- wherein the compressor housing comprises
  - a compression chamber for compressing gas drawn in by the compressor rotor and
  - at least one oil chamber, in which at least one oil-lubricated bearing of the rotor bearing for mounting a shaft section of the compressor rotor is accommodated,
- a shaft seal arrangement assigned to the shaft section, which is arranged between the oil-lubricated bearing and the compression chamber to seal the compression chamber against oil ingress from the oil chamber, and has a seal, in particular a non-contact seal,
- wherein the oil chamber has at least one gas inlet for a leakage gas flow from the shaft seal arrangement and a gas outlet which is connected to at least one oil separator, in particular an oil mist separator, wherein the oil chamber is designed to provide an oil chamber pressure $p_{OR}$ which exceeds the ambient pressure $p_0$ of the compressor housing by an oil separation pressure difference $\Delta p$, which is preferably at least 20 mbar.

This alternative of the invention is based on the idea of generating an overpressure in the oil chamber compared to the environment by means of the leakage gas stream flowing into the oil chamber, which can be used for oil separation. Reference is made to the previous explanations of the invention and its effects and advantages, which apply analogously to this alternative of the invention. A leakage gas flow contains, in particular, compressed gas or gas to be compressed flowing out of the compression chamber and flowing into the oil chamber, in particular due to leakage of the shaft seal arrangement.

In one embodiment of this alternative, the seal is an outer seal facing the oil-lubricated bearing, in particular without contact, and the shaft seal arrangement also has an inner seal facing the compression chamber, in particular without contact, wherein a sealing gas chamber for receiving sealing gas is formed between the outer seal and the inner seal, wherein the leakage gas flow from the shaft seal arrangement is in particular a sealing gas flow from the sealing gas chamber. In this respect, reference is made to the previous explanations of the invention in connection with a sealing gas chamber or a sealing gas flow, which apply analogously to this embodiment.

In a preferred embodiment, the gas inflow of the oil chamber is formed by at least one sealing gap of the seal, in particular the outer seal. A seal can have several sealing gaps, preferably arranged axially one behind the other. The sealing gap is caused in particular by a non-contact seal and preferably extends in the circumferential direction of the shaft section of the compressor rotor. In particular, the sealing gap enables the (unobstructed) flow of a sealing gas flow through the outer seal of the shaft seal arrangement and/or the flow of a leakage gas flow through the (entire) shaft seal arrangement, which can originate from the sealing gas chamber or from the compression chamber.

In a further embodiment, the compressor comprises at least one pressure sensor for detecting the oil chamber pressure $p_{OR}$. Different oil chamber pressures may be present in different oil chambers, which are detected by pressure sensors assigned to the oil chambers. A pressure sensor can detect the oil chamber pressure (directly) in the oil chamber or (indirectly) in a gas volume connected to the oil chamber. Preferably, the pressure sensor can detect the pressure in a line section in which (essentially) the same pressure prevails as the oil chamber pressure, for example in a connection line to the oil separator downstream of the gas outlet of the oil chamber. Detecting the oil chamber pressure $p_{OR}$ enables the oil separation pressure difference $\Delta p$ to be determined.

In a further embodiment, the oil separator, in particular oil mist separator, comprises a plurality of separation stages, in particular at least one pre-separator and/or at least one fine separator and/or at least one residual oil separator. The oil separator can also (only) comprise several similar separation stages, in particular (only) several fine separators. In particular, several fine separators can be connected in series. The fine separator preferably comprises a coalescence filter, wherein a plurality of (similar) coalescence filters can be connected in series. For example, the oil separation pressure difference Δp for two coalescence filters connected in series with a separation pressure difference of 200 mbar each could be 400 mbar in total. The pre-separator preferably comprises a demister and/or a wire mesh and/or a cyclone separator and/or flow deflectors, in particular with baffles. The residual oil separator preferably comprises an adsorption filter. Several separation stages can increase the purity of the (purified) gas flow escaping into the environment or reduce the contamination of the environment. A knitted wire mesh or a demister can form a first separation stage, which separates coarser oil droplets in particular and preferably only generates a low pressure loss. A coalescence filter can form a second separation stage, which in particular separates a (fine) oil mist and generates a pressure loss of between 100 mbar and 300 mbar, for example. An adsorption filter, preferably an activated carbon absorber, can form a third separation stage, which in particular absorbs any remaining residual oil and/or an oil vapor. Compared to a coalescence filter, an adsorption filter can also filter or bind oil vapors. With an adsorption filter, in particular as the last separation stage of a multi-stage separation, a particularly good cleaning of the compressed gas (e.g. the air) can be achieved for the best possible reduced contamination of the environment.

In a preferred embodiment, the sealing gas flow and/or the leakage gas flow is an air flow, wherein an air outlet downstream of the oil separator leads into the free environment of the compressor. In particular, the compressed gas (leakage gas or leakage gas flow) and sealing gas (sealing gas flow) is air. As a result, an oil-cleaned mixture of leakage air and sealing air flows out into the environment (atmosphere).

In a further embodiment, the compressor comprises an oil return line for oil separated in the oil separator into the oil chamber, wherein an oil pump is preferably arranged in the oil return line. The oil pump is preferably designed as a peristaltic pump or vibrating diaphragm pump. To generate a return pressure, the oil return line can have a height difference between a higher position of the oil separator and a lower position of an oil inlet into the oil chamber. Alternatively or additionally, an oil collection container, in particular an oil sump, can be provided, which can be connected to the oil chamber, in particular via a gas discharge line, or is arranged therein, preferably integrated into the compressor housing. An oil return line creates a closed oil circuit, which in particular enables low-maintenance (continuous) operation of the compressor.

In a further embodiment, the compressor comprises a, preferably controllable, blow-off valve for releasing the oil chamber pressure $p_{OR}$ from the oil chamber. The blow-off valve can be arranged in a blow-off opening in the housing wall of the oil chamber and is preferably designed as a pressure relief valve or (current-free open) solenoid valve. A blow-off valve can have a relief function for venting the oil chamber, for example in the event of overpressure or in the event of a malfunction such as a power failure. This can ensure that the desired direction of the pressure gradient from the compression chamber to the oil chamber (from inside to outside) can be maintained at all times to ensure that no oil can enter the sealing gas chamber. This prevents contamination of the compressed air even in the event of a malfunction.

In a further embodiment, the rotor bearing comprises an oil-lubricated suction-side bearing and an oil-lubricated pressure-side bearing, each of which rotatably supports a shaft section of the compressor rotor with respect to the compressor housing, wherein the compressor housing has a suction-side oil chamber, in which the suction-side bearing is accommodated, and a pressure-side oil chamber, in which the pressure-side bearing is accommodated, wherein the suction-side oil chamber and the pressure-side oil chamber are connected to one another, in particular via a connection line. In particular, a respective shaft seal arrangement is provided in each case for the suction-side bearing and the pressure-side bearing, which is preferably arranged between the respective oil-lubricated bearing and the compression chamber for sealing the compression chamber against oil ingress from the respective oil chamber, and has a respective, in particular non-contacting, seal, in particular an outer seal facing the respective oil-lubricated bearing, in particular a non-contacting outer seal, and a respective inner seal facing the compression chamber, in particular a non-contacting inner seal. The connection line can extend (partially) inside and/or (partially) outside the housing, in particular as a through channel in the compressor housing. The connection of both oil chambers results in particular in a uniform oil chamber pressure $P_{OR}$ in both oil chambers, wherein both oil chambers are preferably connected to a common oil separator. Alternatively, the suction-side oil chamber and the pressure-side oil chamber can be separate from one another, with one oil separator preferably connected to each chamber.

In a further embodiment, the rotor bearing comprises an oil-lubricated suction-side bearing and an oil-lubricated pressure-side bearing, each of which rotatably supports a shaft section of the compressor rotor with respect to the compressor housing, wherein a suction-side shaft seal arrangement is provided for the suction-side bearing and a pressure-side shaft seal arrangement is provided for the pressure-side bearing, wherein the suction-side sealing gas chamber of the suction-side shaft seal arrangement and the pressure-side sealing gas chamber of the pressure-side shaft seal arrangement are connected to one another via a sealing gas connection line. In particular, the suction-side shaft seal arrangement has an outer suction-side seal facing the oil-lubricated bearing, in particular without contact, and an inner suction-side seal facing the compression chamber, in particular without contact, wherein a suction-side sealing gas chamber for receiving sealing gas is formed between the outer suction-side seal and the inner suction-side seal. In particular, the pressure-side shaft seal arrangement has an outer pressure-side seal facing the oil-lubricated bearing, in particular a non-contacting outer pressure-side seal, and an inner pressure-side seal facing the compression chamber, in particular a non-contacting inner pressure-side seal, wherein a pressure-side sealing gas chamber for receiving sealing gas is formed between the outer pressure-side seal and the inner pressure-side seal. The sealing gas connection line can extend (partially) inside and/or (partially) outside the housing, in particular as a through channel or bore in the compressor housing. Sealing gas chambers of different compressor stages can be connected to each other via one or more sealing gas connection line(s). The sealing gas connection lines between different sealing gas chambers allow sealing gas to be fed from a higher-pressure sealing gas chamber to a lower-pressure sealing gas chamber. For example, the higher pressure in the compression chamber usually results in a larger leakage flow at shaft seals on the pressure side, and therefore a larger sealing gas flow, than at shaft seals on the suction side. Similarly, a larger leakage flow typically occurs at shaft seals of a (second) high-pressure compressor stage than at shaft seals of a (first) low-pressure compressor stage. The sealing gas connection lines make it possible to supply other sealing chambers according to the resulting pressure drops. This means that, preferably without a supply (replenishment) of sealing gas, a sufficiently high sealing gas chamber pressure can be provided under certain conditions to reliably seal the assigned shaft section in a sealing gas chamber.

In a further embodiment, the shaft seal arrangement additionally has a middle seal, in particular a non-contacting middle seal, between the outer seal and the inner seal, wherein an outer sealing gas chamber for receiving sealing gas is formed between the outer seal and the middle seal and an inner sealing gas chamber for receiving sealing gas being formed between the middle seal and the inner seal. Suction-side and pressure-side inner sealing gas chambers can be connected to each other via a (first) sealing gas connection line. Suction-side and pressure-side outer sealing gas chambers can be connected to each other via a (second) sealing gas connection line. Different sealing gas chamber pressures can prevail, in particular be set, in the inner and outer sealing gas chambers. The sealing gas chamber pressure of the inner sealing gas chamber is preferably higher than the sealing gas chamber pressure ($p_{SGR}$) of the outer sealing gas chamber. A shaft seal arrangement with two (or more) sealing gas chambers arranged axially one behind the other can increase the sealing effect of the shaft seal arrangement.

In a further embodiment, the compressor has a sealing gas supply by means of which the sealing gas chamber pressure $p_{SGR}$ in at least one sealing gas chamber is variably adjustable, preferably regulatable, wherein the sealing gas supply comprises in particular a, preferably regulatable, sealing gas supply valve. In particular, the sealing gas supply comprises a sealing gas feed and/or a sealing gas supply line connected to at least one sealing gas chamber. The sealing gas supply valve can be a purely mechanical valve, a 2-point solenoid valve (open/closed) or a continuously regulatable valve, such as a proportional valve or a pressure-reducing valve, or a combination of several valves. The sealing gas connection line can be part of the sealing gas supply line. The sealing gas supply line can be connected to a sealing gas connection line. The sealing gas feed can comprise an external sealing gas supply, such as the compressed air network or a separate compressor (e.g. piston compressor), or an internal sealing gas supply, such as branched compressed gas, a return from the pressure side to the suction side within a compressor stage or a return from a (second) high-pressure compressor stage to a (first) low-pressure compressor stage. A sufficiently high sealing gas chamber pressure $p_{SGR}$, which is preferably (always) higher than the oil chamber pressure $p_{OR}$, can be ensured via the sealing gas supply by feeding sealing gas into the sealing gas chambers as required. This makes it possible to react to varying pressure conditions due to different operating states within the compressor.

In a further embodiment, the compressor has at least one sealing gas buffer volume between a sealing gas feed and a sealing gas chamber, which is preferably designed as a cavity in the compressor housing. A sealing gas buffer volume can also be formed as a cavity in a multi-part housing, for example (partially) in a compressor housing and/or (partially) in a gear housing of the compressor. The compressor housing and the gear housing are preferably manufactured as cast parts. However, the sealing gas buffer volume can also be designed as a gas pressure vessel. The volume of the sealing gas chambers can be made smaller by using an (additional) sealing gas buffer volume. A sealing gas buffer volume can ensure sufficient maintenance of the sealing gas chamber pressure during transient operating states of the compressor, for example during shutdown or sputtering of the compressor and/or venting of the oil chamber, or in the event of insufficient sealing gas feed, e.g. at low system pressure. A sealing gas buffer volume helps to ensure that the sealing gas chamber pressure $p_{SGR}$ can be kept higher than the oil chamber pressure $p_{OR}$ in preferably all operating states of the compressor. This improves the sealing effect of the shaft seal arrangement and also ensures a (continuous) gas flow (sealing gas flow) into the oil chamber in order to build up or maintain the oil chamber pressure $p_{OR}$.

In a further embodiment, the compressor comprises at least one pressure sensor for detecting a sealing gas chamber pressure $p_{SGR}$, in particular in at least one sealing gas chamber and/or in a sealing gas buffer volume. The sealing gas chamber pressure $p_{SGR}$ in the sealing gas chamber is typically (essentially) the same as the sealing gas chamber pressure in the sealing gas buffer volume. In particular, the pressure in the sealing gas buffer space can be recorded and/or monitored instead of the pressure in the sealing gas chamber.

In a further embodiment, a control unit, preferably an electronic one, is provided, which is designed to monitor the sealing gas chamber pressure $p_{SGR}$ and/or the oil chamber pressure $p_{OR}$ and/or the differential pressure between the sealing gas chamber pressure $p_{SGR}$ and the oil chamber pressure $p_{OR}$. The sealing gas chamber pressure $p_{SGR}$ and the oil chamber pressure $p_{OR}$ can be detected via pressure sensors described above, which are connected to the control unit (wireless or wired). The control unit can be designed to calculate the pressure difference between the sealing gas chamber pressure $p_{SGR}$ and the oil chamber pressure $p_{OR}$ and to regulate at least one sealing gas supply valve of the sealing air supply based on the pressure difference. Alternatively (or additionally), the differential pressure can be recorded (measured) via a differential pressure transducer and transmitted to the control unit for regulating at least one sealing gas supply valve. The control unit can be arranged on the compressor or connected to the compressor via a transmitter/receiver unit via a data link, in particular via a network. The sealing gas chamber pressure $p_{SGR}$, the oil chamber pressure $p_{OR}$ and/or the differential pressure can be monitored at fixed or variable time intervals or continuously. The time curve can be stored in a memory unit. Monitoring the differential pressure in particular enables the sealing gas chamber pressure $p_{SGR}$ to be readjusted accordingly by increasing the supply of sealing air.

In a further embodiment, a control unit, preferably an electronic one, is designed to set the sealing gas chamber pressure $p_{SGR}$ in the sealing gas chamber, in particular for different operating states of the compressor, such that the sealing gas chamber pressure $p_{SGR}$ is higher than the oil chamber pressure $p_{OR}$ in the oil chamber, preferably by regulating a sealing gas supply valve, which is arranged in particular in a sealing gas supply line to the at least one sealing gas chamber. In a particularly preferred embodiment, the sealing gas chamber pressure $p_{SGR}$ is set or regulated in such a way that the following pressure gradient applies: $p_0<p_{OR}<p_{SGR}$, preferably in every operating state of the compressor or over the entire operating time of the compressor. Different sealing gas chamber pressures can be set in different sealing gas chambers. In particular, if a shaft seal arrangement has two sealing gas chambers, the sealing gas chamber pressure in the inner sealing gas chamber is preferably set higher than in the outer sealing gas chamber. This ensures that a sealing gas flow always flows from the gas inlet in the direction of the oil chamber, i.e. coming from the sealing gas chamber, through the outer seal and from the outer seal into the oil chamber. This prevents a flow of contaminated gas (and oil) from the oil chamber through the shaft seal arrangement into the compression chamber.

In an alternative embodiment, the compressor has a sealing gas supply valve designed as a pressure reducing valve, which is arranged in particular in a sealing gas supply line to the at least one sealing gas chamber. A (mechanical) pressure reduction valve can comprise a diaphragm. However, a pressure reducing valve could also be designed as a solenoid valve. In particular, the pressure reducing valve provides a sufficiently high outlet pressure to adjust the sealing gas chamber pressure $p_{SGR}$ in the sealing gas chamber so that the sealing gas chamber pressure $p_{SGR}$ is higher than the oil chamber pressure $p_{OR}$ in the oil chamber. In particular, the outlet pressure of the pressure reducing valve is set higher than the (desired) oil chamber pressure $p_{OR}$ in the oil chamber. When using a (mechanical) pressure reducing valve, there is no need for a complex (electronic) control system for an (electronically) controllable sealing gas supply valve. In this respect, a pressure reducing valve is a cost-effective alternative, especially for simpler, preferably single-stage, designs of a dry-compressing compressor. However, a pressure reducing valve has the disadvantage that more sealing air may be supplied than would actually be required, for example if the compressor is running under load and the leakage gas flow would actually be sufficiently large to provide the required sealing gas chamber pressure $p_{SGR}$.

In one embodiment, at least one sealing gas chamber has a negative pressure safety device, which is preferably designed as a non-return valve that opens towards the sealing gas chamber. In particular, the negative pressure safety device comprises a valve that opens the respective sealing gas chamber when the pressure falls below a minimum pressure, preferably as soon as the pressure in at least one sealing gas chamber is lower than the ambient pressure, preferably towards the surroundings of the compressor housing. An individual negative pressure safety device can be assigned to each sealing gas chamber. A negative pressure safety device can provide the ambient pressure (atmospheric pressure) as the minimum pressure in the sealing gas chambers when the compressor starts up without pressure or in the event of a fault (power failure).

In one embodiment, oil chambers of several compressor stages, in particular an oil chamber of a first compressor stage and an oil chamber of a second compressor stage, are preferably connected to one another via a common gear housing and/or via connection lines. In particular, the suction-side oil chamber of the first compressor stage is connected to the suction-side oil chamber of the second compressor stage or the pressure-side oil chamber of the first compressor stage is connected to the pressure-side oil chamber of the second compressor stage via a common gear housing. The drive gearbox of the compressor rotors can be arranged (in whole or in part) in the gear housing.

In a further embodiment, the compressor has a plurality of compressor stages, wherein at least one sealing gas chamber of a first compressor stage, preferably operating at a lower first pressure level, is connected to at least one sealing gas chamber of a second compressor stage, preferably operating at a higher second pressure level, preferably via a sealing gas connection line. The sealing gas chambers of the first and second compressor stages are connected to each other in particular in such a way that a leakage gas flow from the second compressor stage, preferably flowing out of the pressure-side shaft seal arrangement of the second compressor stage, can flow to at least one sealing gas chamber of the first compressor stage. In this way, the pressure gradient of a two-stage (or multi-stage) compressor is used to generate sealing air for the compressor stage with the lower pressure level. Since the volume of the leakage gas flow increases with the pressure level of the compressor stages, there is sufficient sealing air available, particularly with several compressor stages, depending on the operating conditions, preferably at least in the load run, in order to switch off a sealing gas supply at least temporarily, i.e. for certain operating states, and to ensure the supply of sealing air for all compressor stages solely by the leakage gas flow of the higher (highest) compressor stage(s).

The said object is also solved in particular by a method for oil separation for a dry-compressing compressor having one or more compressor stages (2, 3) for generating a compressed gas, in particular for generating compressed air, in particular for a dry-compressing compressor according to the invention, having an oil-lubricated rotor bearing of at least one compressor rotor of the compressor, wherein the method comprises the following steps of:

- introducing a leakage gas flow, in particular a sealing gas flow, which flows out of a shaft seal arrangement assigned to a shaft section of the compressor rotor, into an oil chamber of a compressor housing of the compressor, in which at least one oil-lubricated bearing of the rotor bearing is accommodated,
- providing an oil chamber pressure $p_{OR}$ in the oil chamber which
  - exceeds the ambient pressure $p_0$ of the compressor housing by an oil separation pressure difference Δp, which is preferably at least 20 mbar.
- Feeding a gas flow from the oil chamber to an oil separator.

The method is based on the idea of introducing a leakage gas flow into the oil chamber to create an overpressure in the oil chamber compared to the environment, which can be used for oil separation. The alternative or additional introduction of a sealing gas flow into the oil chamber can also generate or contribute to an overpressure in the oil chamber. In particular, the oil chamber pressure generated by the inflowing leakage gas and/or sealing gas flow provides a sufficiently large pressure difference (oil separation pressure difference Δp) to allow an oil/gas flow fed to the oil separator from the oil chamber to flow through the oil separator. In particular, a pressure reduction on the outflow side of the oil separator can be dispensed with. The method according to the invention has similar effects and advantages to those already described in connection with the dry-compressing compressors according to the invention. The method can implement some or all of the process engineering features described in connection with the dry-compressing compressors.

The supply of a gas flow from the oil chamber to an oil separator comprises in particular the application of the oil chamber pressure to an inflow side of the oil separator (essentially, i.e. except for small dissipative pressure losses, for example in connection lines or through flow deflections). In particular, the method comprises a step for separating oil from the gas flow in the oil separator. In particular, as a further method step, the cleaned gas flow is led away from the outflow side of the oil separator into the (free) environment of the compressor housing. In addition to the usual purpose of sealing the compression chamber against gas outlet and gas inlet, the shaft seal arrangement is designed in particular to seal a compression chamber of the compressor against oil inlet from the oil chamber and is preferably arranged between the oil-lubricated bearing and a compression chamber of the compressor housing.

One embodiment of the method comprises at least one of the following steps of:

detecting the oil chamber pressure $p_{OR}$ by at least one pressure sensor; and/or detecting a sealing gas chamber pressure $p_{SGR}$, in particular in at least one sealing gas chamber of the shaft seal arrangement and/or in a sealing gas buffer volume of a sealing gas supply, by at least one pressure sensor; and/or determining the differential pressure between the sealing gas chamber pressure $p_{SGR}$, in particular the sealing gas chamber pressure $p_{SGR}$ in at least one sealing gas chamber of the shaft seal arrangement and/or in a sealing gas buffer volume of a sealing gas supply, and the oil chamber pressure $p_{OR}$, wherein the shaft seal arrangement has in particular an outer seal facing the oil-lubricated bearing, in particular without contact, and an inner seal facing the compression chamber, in particular without contact, and the sealing gas chamber is formed in particular between the outer seal and the inner seal for receiving sealing gas; and/or monitoring of the sealing gas chamber pressure $p_{SGR}$ and/or the oil chamber pressure $p_{OR}$ and/or the differential pressure between the sealing gas pressure $p_{SGR}$ and the oil chamber pressure $p_{OR}$ by a control unit.

The differential pressure can be determined by detection (measurement) by a sensor, in particular a differential pressure transducer, or by calculation based on the oil chamber pressure $p_{OR}$ and the sealing gas chamber pressure $p_{SGR}$.

One embodiment of the method comprises as a further step the setting, in particular variable setting, preferably regulation, of a sealing gas chamber pressure $p_{SGR}$ in at least one sealing gas chamber of the shaft seal arrangement by supplying sealing gas into the sealing gas chamber, in particular as a function of an operating state of the compressor, so that the sealing gas chamber pressure $p_{SGR}$ is higher than the oil chamber pressure $p_{OR}$ in the oil chamber. The sealing gas chamber pressure $p_{SGR}$ is regulated in particular by regulating a sealing gas supply valve of a sealing gas supply into the at least one sealing gas chamber. The sealing gas supply valve can be controlled by a control unit, preferably continuously variable. Alternatively, the sealing gas chamber pressure $p_{SGR}$ can be adjusted via a (mechanical) pressure reduction valve. Sealing gas can be supplied from an external sealing gas supply or an internal sealing gas supply of the compressor.

One embodiment of the method comprises as a further step the supply of sealing gas into the sealing gas chamber so that the sealing gas chamber pressure $p_{SGR}$ in the sealing gas chamber is higher than the oil chamber pressure $p_{OR}$ in the oil chamber while the compressor is operated at idle and/or during transient operating states of the compressor, preferably during a start-up state or a shutdown state of the compressor, and/or while the compressor is operated at load, in particular if the compressor is a single-stage compressor. With single-stage compressors in particular, the generated leakage gas flow may not be sufficient for a sufficient sealing air volume to provide the required sealing gas chamber pressure $p_{SGR}$, so that an (internal or external) sealing gas supply is also required during load operation. For two-stage or multi-stage compressors, however, the sealing gas supply may be dispensable, at least during load operation, due to the larger leakage air flows that occur.

One embodiment of the method comprises feeding a leakage gas flow from at least one sealing gas chamber of a second compressor stage, preferably operating at a higher second pressure level, into at least one sealing gas chamber of a first compressor stage, preferably operating at a lower first pressure level, preferably via a sealing gas connection line connecting the sealing gas chambers, wherein the leakage gas flow preferably flows out of a pressure-side shaft seal arrangement of the second compressor stage into a pressure-side sealing gas chamber of the second compressor stage. In this way, the pressure drop of a two-stage (or multi-stage) compressor is used to generate sealing air for the compressor stage with the lower pressure level.

BRIEF DESCRIPTION OF THE DRAWINGS

Exemplary embodiments of the invention are explained in more detail below with reference to the drawings, wherein.

DETAILED DESCRIPTION

In the following description of the invention, the same reference symbols are used for identical and identically acting elements.

The embodiments of the invention described below with reference to FIGS. 1 to 5 each illustrate different aspects of the invention. The embodiments shown can be combined with each other, unless technically contradictory. In particular, individual described components or systems of the dry-compressing compressors according to the invention, such as pressure sensors, the design of the oil separator (multi-stage design, design of the separator stages), the oil return, sealing gas supply and sealing gas feed, negative pressure protection device and, in particular, the control unit and process control system can be supplemented in each embodiment, are interchangeable between the embodiments and can be combined with each other, unless technically contradictory. Unless otherwise indicated, the letter "a" following the reference signs refers to the suction side 85 and the letter "b" to the pressure side 86 of the compressor 1. For example, 19*a* refers to the suction-side oil chamber and 19*b* to the pressure-side oil chamber.

Figure 1:
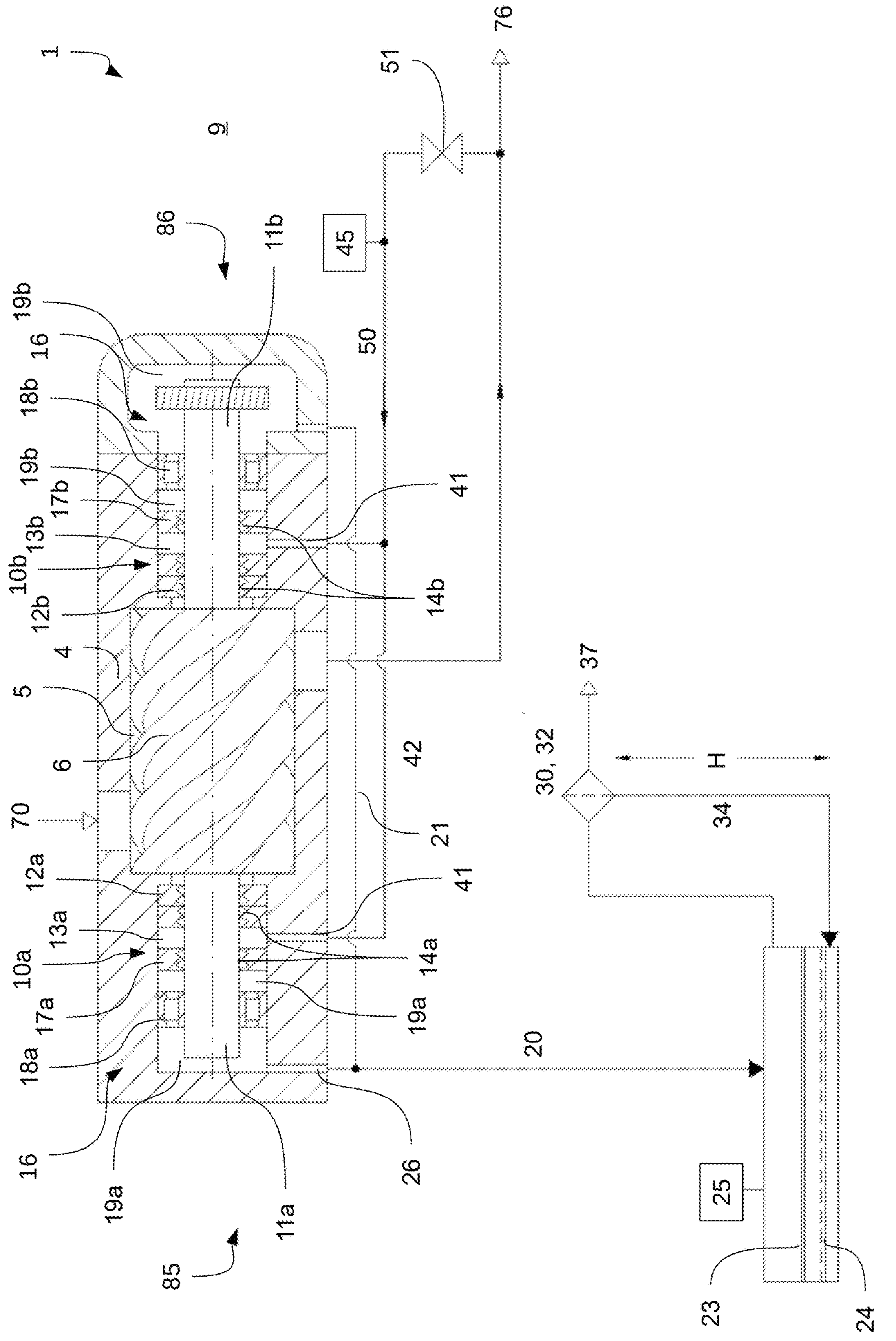
FIG. 1 shows a schematic representation of a first embodiment of a dry-compressing compressor according to the invention.

FIG. 1 shows a (single-stage) dry-compressing or oil-free compressing compressor 1 with oil-lubricated bearings 18*a*, 18*b* in a compressor housing 4. The compressor 1 draws in air as the gas to be compressed via the air inlet 70 on the suction side 85, compresses the air and conveys the compressed air from the pressure side 86 via the compressed air outlet 76 to the application not shown, typically into a compressed air network of a consumer.

The bearings 18*a*, 18*b* of the rotor bearing 16 are lubricated with oil and arranged in the oil chambers 19*a*, 19*b* of the compressor housing 4, in which the lubricating oil mixes with gas to form a gas-air mixture in the form of an oil mist containing aerosols from the lubricating oil. However, the compression chamber 5, in which the gas is compressed by rotating one or more compressor rotors 6, should remain free of oil. For this purpose, the shaft seal arrangements 10*a*, 10*b* are sealed against the oil chambers 19*a*, 19*b* with inner seals 12*a*, 12*b* and outer seals 17*a*, 17*b*. The seals 17*a*, 17*b* and 12*a*, 12*b* are non-contacting and not completely sealed due to high circumferential speeds and temperatures during operation. A narrow sealing gap 14*a*, 14*b* remains on the circumference of the shaft sections 11*a*, 11*b* of the compressor rotor 6, which are assigned to the shaft seal arrangements 10*a*, 10*b*, through which a gas flow can flow in the direction of the compression chamber 5, or vice versa, depending on the pressure gradient. This gas flow occurs due to the leakage of the seals 17*a*, 17*b* and 12*a*, 12*b*. However, no lubricant may enter the compression chamber 5 or the surroundings 9 of the compressor housing 4 in order not to jeopardize the purity of the compressed gas.

According to one embodiment of the invention, a sealing gas system counteracts the entry of lubricant into the compression chamber 5. A sealing gas chamber 13*a*, 13*b* is arranged between the inner seal 12*a*, 12*b* and the outer seal 17*a*, 17*b*. The sealing gas chambers 13*a*, 13*b* of suction-side and pressure-side shaft seal arrangements 10*a* and 10*b* are connected to each other via sealing gas connection lines 42, which can also be designed as bores in the compressor housing 4. Sealing gas flows from the sealing gas chambers 13*a*, 13*b* into the oil chambers 19*a*, 19*b* at a corresponding pressure drop. The oil chambers 19*a*, 19*b* are each sealed off from the environment 9 in such a way that they can build up and maintain an oil chamber pressure $p_{OR}$ that is higher than the ambient pressure $p_0$, i.e. an overpressure.

There is usually an air leakage flow from the compression chamber 5 into the sealing gas chamber 13*b* via the inner seal 12*b* on the pressure side 86. At higher pressure in the compression chamber 5, the air leakage flow is higher. Therefore, the air leakage flows at the inner seals 12*a* and 12*b* are different. On the suction side 85, the leakage flow via the inner seal 12*a* is smaller than on the pressure side 12*b* and can reverse in the opposite direction. On the suction side 85, some sealing gas can also be drawn into the compressor chamber 5 via the inner seals 12*a* during load operation, as the pressure here is lower over a large part of the circumference of the compressor rotors 6 than in the sealing gas chamber 13*a*. In normal load operation, the sealing gas chamber pressure $p_{SGR}$ is maintained in the connected sealing gas chambers 13*a*, 13*b* due to the leaks in the inner seal 12*a* and especially the inner seal 12*b*.

In certain operating states, e.g. with low compression pressures or transient processes, sealing gas is additionally supplied to the sealing gas chambers 13*a*, 13*b* via a sealing gas supply line 50 and a regulated sealing gas supply valve 51. The sealing gas supply valve 51 can also be designed as a mechanical pressure reducing valve, especially for more cost-effective designs of the compressor 1, wherein a control unit 60 described below could also be dispensed with. In the embodiment shown in FIG. 1, the additional sealing gas (sealing air) is branched off from the compressed air flow fed to the compressed air outlet 76 and fed to the sealing gas supply ducts 41 as an internal sealing gas feed via the sealing gas supply valve 51. The sealing gas chamber pressure $p_{SGR}$ in the sealing gas chambers 13*a*, 13*b* is thus always set higher during operation than the oil chamber pressure $p_{OR}$ in the oil chambers 19*a*, 19*b*, which are connected to each other via the connection line 21. Due to the described pressure gradient from the sealing gas chambers 13*a*, 13*b* to the oil chamber 19*a*, 19*b* ($p_{OR}<p_{SGR}$), air leaks are generated (during operation) via the outer seals 17*a*, 17*b* from the dry sealing gas chambers 13*a*, 13*b* into the oil chambers 19*a*, 19*b*, which flow into the oil chambers 19*a*, 19*b* as sealing gas flows. Due to this pressure difference across all outer seals 17*a* and 17*b*, the lubricant, i.e. the oil, is held in the oil chambers 19*a*, 19*b* despite the sealing gap 14*a*, 14*b* and at the same time a sealing gas flow, which can contain supplied sealing air and leakage air from the compression chamber 5, is forced into the oil chambers 19*a*, 19*b*, where the oil chamber pressure $p_{OR}$ builds up or prevails. The sealing gas chamber pressure $p_{SGR}$ is detected by the pressure sensor 45. The oil chamber pressure $p_{OR}$ is recorded by the pressure sensor 25. The measured pressure values for $p_{SGR}$ and $p_{OR}$ are transmitted to the control unit 60, which uses them to determine the differential pressure (not shown in FIG. 1).

According to a further aspect of the invention, the oil-contaminated leakage or sealing gas flow does not pass unpurified from the oil chambers 19*a*, 19*b* via the air outlet 37 into the environment 9 or even into the intake area of the air inlet 70 of the compressor 1, but is fed through a gas outlet 26 via a gas discharge line 20 to an oil separator 30. The gas outlet 26 is designed as a through-opening in the compressor housing 4. The oil separator 30 can comprise several, preferably three, separation stages. In the oil separator 30, the oil (oil droplets and oil aerosols) is separated from the air. In this embodiment, the oil separator 30 comprises a fine separator 32, namely a dense coalescence filter. The separated oil collects on the dry side of the filter element.

In the embodiment shown, the oil is returned via gravity and a height difference H of the oil return line 34 that is sufficient for all operating conditions, including the pressure conditions in load operation. The oil return line 34 guides the separated oil into the oil sump 24 to a level below the oil level 23, which prevents oil mist from the gas discharge line 20 from flowing via the oil return line 34, bypassing the oil separator 30. An oil pump 36 (see FIGS. 4 and 5) can be used instead of or in addition to a height difference. The height difference H or the delivery rate of the oil pump 36 is selected according to the maximum differential pressure of the oil separator 30, in particular the coalescence filter element of the fine separator 32, which can be 100 to 300 mbar, for example.

The oil chamber pressure $p_{OR}$ built up by the inflow of sealing air and leakage air into the oil chamber 19*a*, 19*b* exceeds the ambient pressure $p_0$ of the compressor housing by a sufficiently large oil separation pressure difference $\Delta p$, which is required so that the air flow flowing out of the gas outlet 26 overcomes the pressure difference of the oil separator 30. If the gas flow overcomes a pressure drop from the oil chamber 19*a*, 19*b* via the inflow side to the outflow side of the oil separator 30 of e.g. 200 mbar, for example as a pressure difference via a coalescence filter element of the fine separator 32, this corresponds to an oil separation pressure difference $\Delta p$ of 20% at atmospheric pressure as the ambient pressure $p_0$ of 1 bar on the outflow side of the oil separator 30, by which the oil chamber pressure $p_{OR}$ exceeds the ambient pressure $p_0$ at least.

Figure 2:
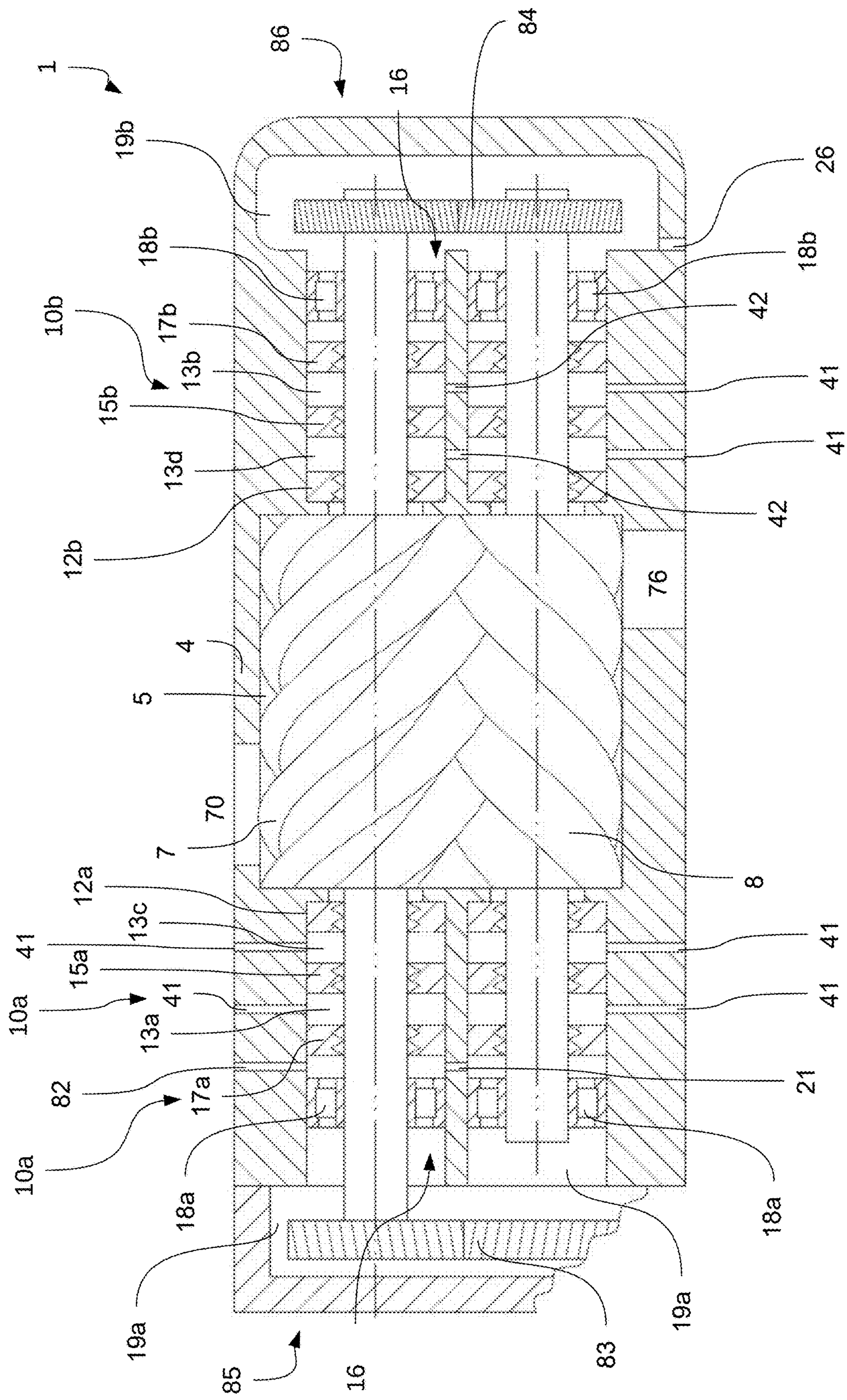
FIG. 2 shows a schematic representation of a second embodiment of a dry-compressing compressor according to the invention having shaft seal arrangements on the suction side and pressure side, each with two sealing gas chambers.

FIG. 2 shows a detailed illustration of a compressor 1, from which the structure of a compressor stage of a screw compressor can be seen. In this perspective, two compressor rotors 7, 8 can be seen, which are helically intermeshed and jointly compress a process gas (air). The compressor rotor 8 is driven by the compressor rotor 7 via the synchronous gear 84.

Between the inner seals 12*a*, 12*b* and outer seals 17*a*, 17*b*, two sealing gas chambers 13*a*, 13*c* and 13*b*, 13*d* are shown, which are separated from each other by additional middle seals 15*a*, 15*b*. The seals 12*a*, 12*b*, 15*a*, 15*b*, 17*a*, 17*b* are non-contacting shaft seals, as the circumferential speed and temperature are too high for contacting seals in the long term. The seals 12*a*, 12*b*, 15*a*, 15*b*, 17*a*, 17*b* can have a conveying effect. For this purpose, for example, a thread can be present, which additionally promotes leakage in the direction of the oil chambers 19*a*, 19*b* during operation.

Oil reaches the oil-lubricated bearings 18*a*, 18*b* as lubricant via the lubricating oil inlet 82. The oil chambers 19*a*, 19*b* are connected to each other via the connection line 21. The oil chamber 19*b* has a gas outlet 26 for connecting the common gas discharge line 20 for feeding the gas flow with the oil mist to an oil separator 30 (not shown in FIG. 2).

On the suction side 85 of the compressor rotors 7 and 8, the sealing gas chambers 13*a*, 13*c* of the two shaft seal arrangements 10*a*, 10*b* have separate sealing gas supply ducts 41, so that there are a total of four sealing gas supply ducts 41 on this side. On the pressure side 86, the sealing gas chambers 13*b*, 13*d* of the two compressor rotors 7 and 8 are connected to one another via through-holes within the compressor housing 4 via a sealing gas connection line 42, so that there are a total of two sealing gas supply ducts 41 on the pressure side 86.

Each of the compressors 1 in FIGS. 1, 3, 4 and 5 can be designed with suction-side and pressure-side shaft seal arrangements 10*a*, 10*b*, each with two sealing gas chambers 13*a*, 13*c* or 13*b*, 13*d* as shown in FIG. 2. In other figures, the perspective is chosen so that only one compressor rotor is visible for better clarity. In addition to an oil-free screw compressor, the compressor 1 could also be an oil-free compressing screw blower, roots blower or a speed compressor.

Figure 3:
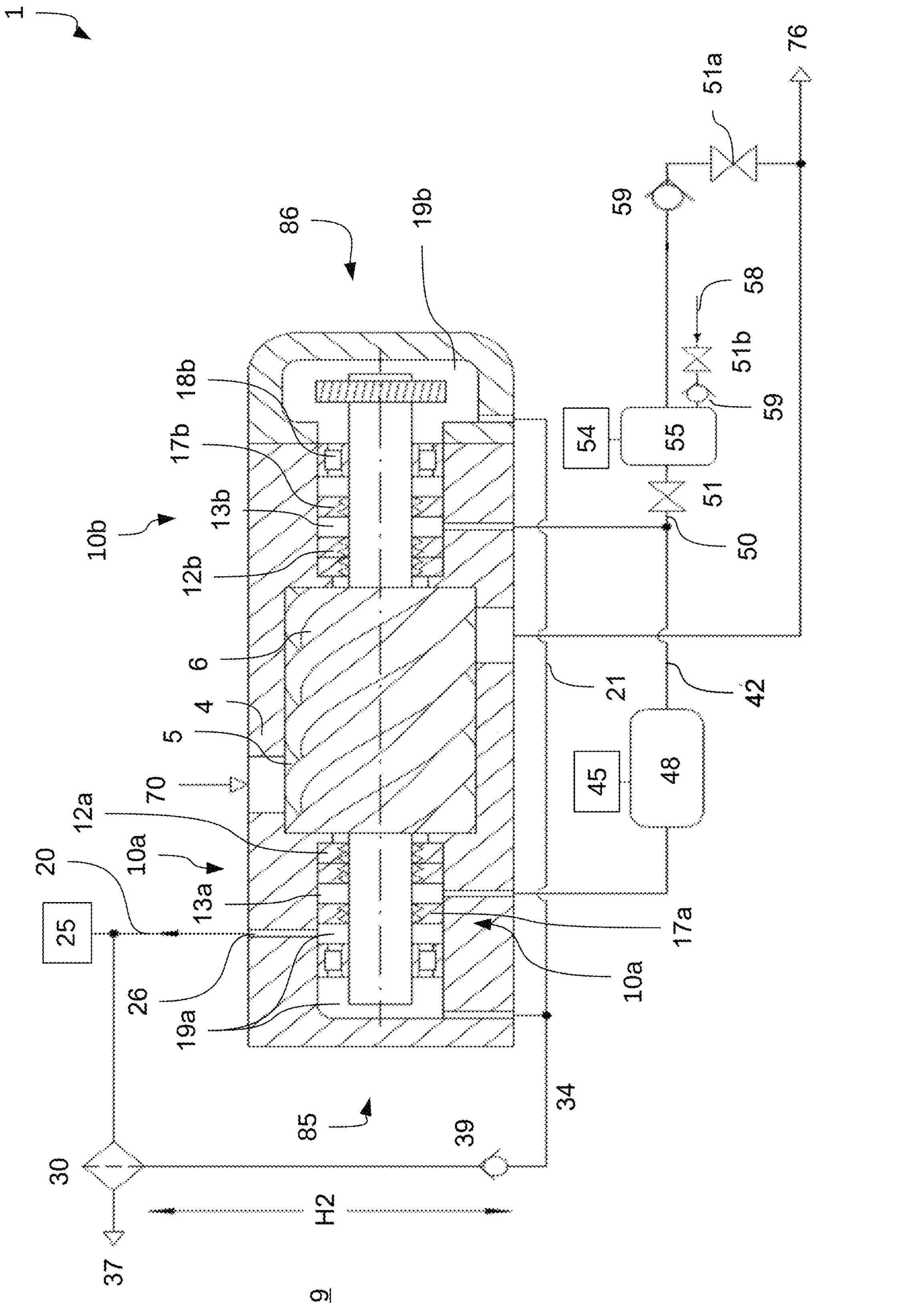
FIG. 3 shows a schematic representation of a third embodiment of a dry-compressing compressor according to the invention having an external sealing gas supply and a sealing gas buffer volume.

FIG. 3 shows a similar compressor 1 to that shown in FIG. 1, with the differences being explained below: The compressor 1 has a sealing gas buffer volume 48, which can be designed as a gas pressure vessel or as a cavity integrated into the compressor housing 4.

The sealing gas chambers are connected to one another by a sealing gas connection line 42, which leads through the sealing gas buffer volume 48 with an expanded flow cross-section. The sealing gas buffer volume 48 can be used to compensate for pressure fluctuations during operation of compressor 1 and to readjust the sealing chamber pressure $p_{SGR}$. At the same time, this sealing gas buffer volume 48 fulfills a cooling function for the sealing gas by increasing the surface area. The sealing gas buffer volume 48 is designed in such a way that it has a separating effect and separates and collects liquid or solid contaminants before the sealing gas is fed to other sealing gas chambers. Separation can be achieved by deflectors for the sealing gas, a reduced flow velocity within the buffer volume and/or by a (coarse) demister mesh.

Furthermore, a sealing gas feed 58 is shown as an external sealing gas source, which serves to provide sealing gas in addition to the internal sealing gas source from the compressed air outlet 76 via the sealing gas supply valve 51*a*. A certain volume of sealing gas is stored in the sealing gas buffer volume 55, e.g. a buffer tank, in order to be able to provide a sufficient supply of sealing gas via the adjustable sealing gas supply valve 51 during transient operating states of the compressor 1, e.g. for safe start-up without pressure at the compressed air outlet 76 or safe venting (shutdown) in the event of a power failure. The non-return valves 59 prevent gas from overflowing from one sealing gas source to the other sealing gas source. The individual sealing gas sources can be used either individually or together via the sealing gas supply valves 51, 51*a* and 51*b*, depending on the detected sealing gas chamber pressure $p_{SGR}$ or other operating parameters. If required, sealing gas can be supplied in this way via the sealing gas supply valve 51 to the sealing gas buffer volume 48 and further to the sealing gas chambers 13*a*, 13*b*. A sealing gas feed 58, in particular an external one, and sealing gas buffer volumes 48, 55 can be used independently of one another.

The pressure $p_{SLR}$ in the sealing gas buffer volume 48, in the sealing gas connection line(s) 42 and in the sealing gas chambers 13 is recorded via the pressure sensor 45. The oil chamber pressure $p_{OR}$ in the oil chambers 19*a*, 19*b* connected via the connection line 21, the gas discharge line 20 and optionally in the oil sump 24 (not shown in FIG. 3) is recorded via the pressure sensor 25. The pressure in the sealing gas buffer volume 55 is detected by the pressure sensor 54. The pressure sensors 25, 45, 54 and the sealing gas supply valves 51, 51*a*, 51*b* are connected to a control unit 60 (not shown).

During operation, the oil is collected in the lower area of the oil separator 30. When the compressor is at a standstill and the pressures between oil separator 30 and oil chamber 19*a*, 19*b* are balanced, the oil is returned to the oil chambers 19*a*, 19*b* via the oil return line 34 using gravity and a sufficient height difference H2. Since in the present exemplary embodiment the height difference H2 alone is not sufficient to reliably prevent an oil backflow for the pressure conditions occurring during load operation, a non-return valve 39 is provided in the oil return line 34, which reliably prevents bypassing of the filter element of the oil separator 30. Return therefore only takes place when the pressure level is lowered, for example when the compressor 1 is at a standstill or possibly idling. In the embodiment shown in FIG. 1 with a sufficiently large height difference H, however, oil recirculation also takes place during load operation.

Figure 4:
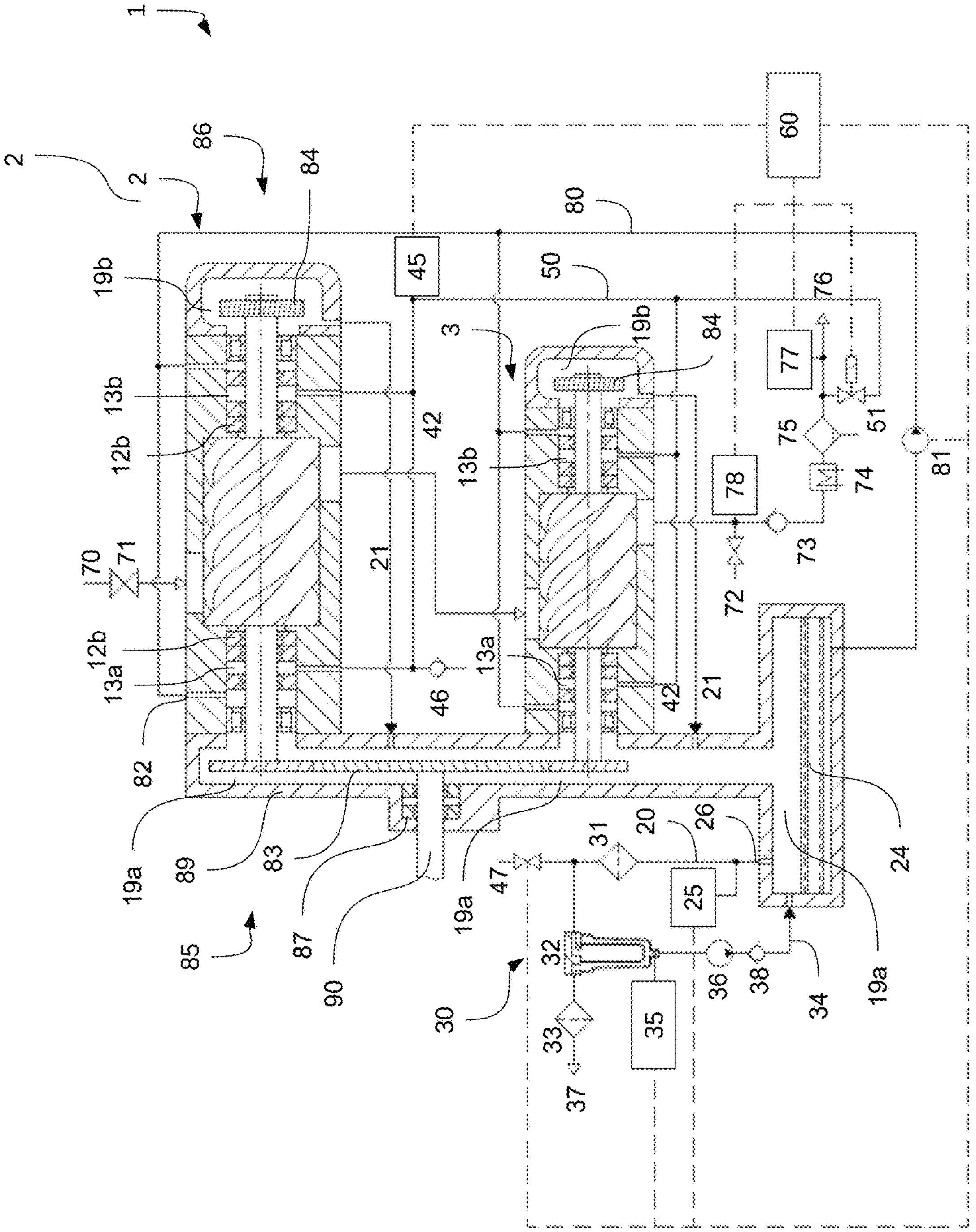
FIG. 4 shows a schematic representation of a fourth embodiment of a dry-compressing compressor according to the invention having two compressor stages.

FIG. 4 shows a two-stage compressor, wherein the first compressor stage 2 and the second compressor stage 3 are connected in series in order to achieve higher final pressures. Here, the sealing gas chambers of the second compression stage 3 are connected to the sealing gas chambers of the first compression stage 2. In this way, leaks in the inner seals 12*a*, 12*b* of the second compressor stage 3 can be used to pressurize the sealing gas chambers 13*a*, 13*b* of the first compressor stage 2.

Figure 5:
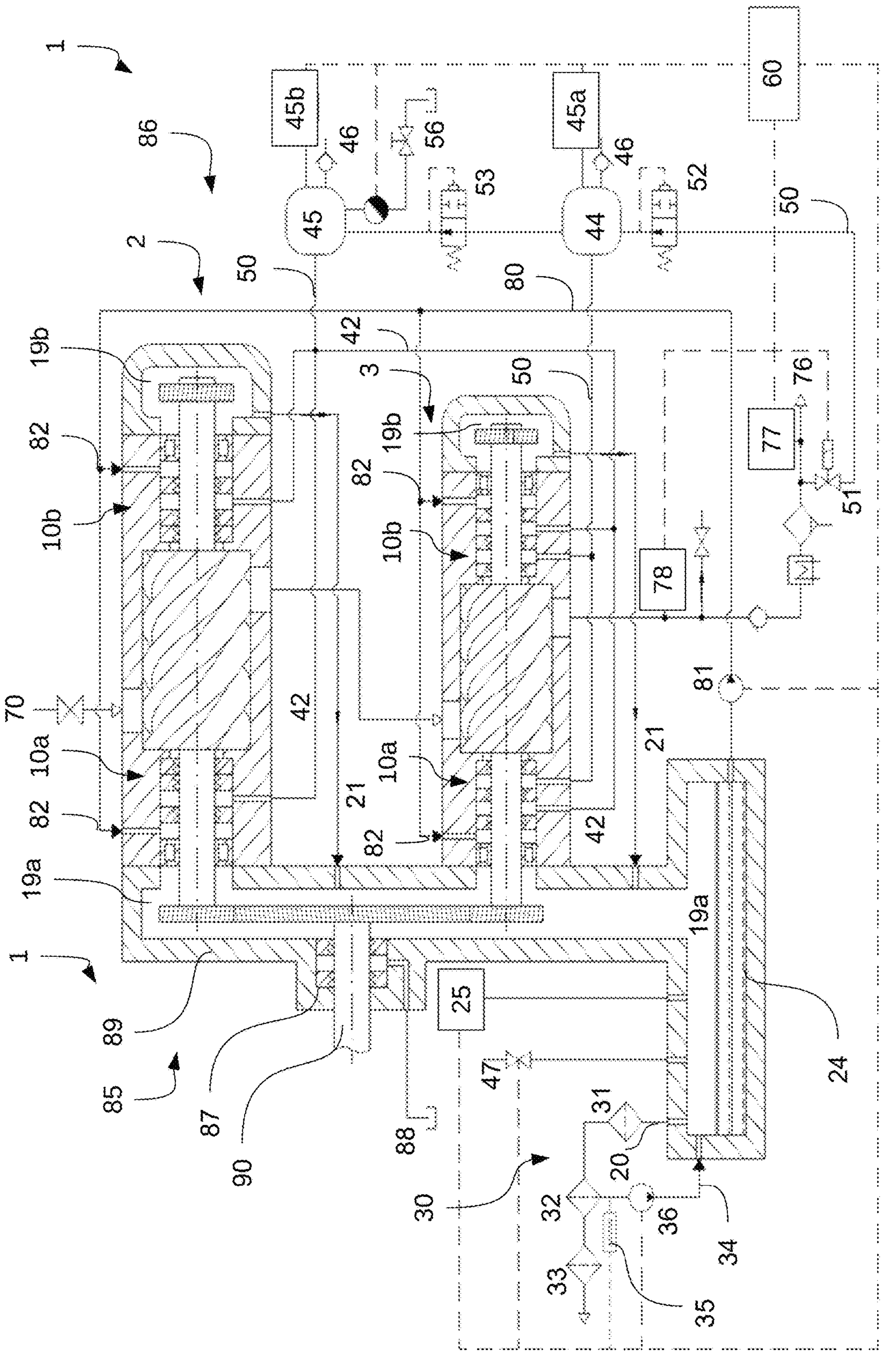
FIG. 5 shows a schematic representation of a fifth embodiment of a dry-compressing compressor according to the invention having two compressor stages and several sealing gas pressures.

An inlet valve 71 is also shown. This can be used to reduce the pressure at the inlet of the first compressor stage 2 and at the same time to blow off the air when the compressor is idling via the relief valve 72. The non-return valve 73 prevents backflow from the compressed air outlet 76. Idle running is partly necessary to enable easier start-up of the compressor and to limit the number of motor starts when the air requirement is low. FIG. 5 also shows an air pressure sensor 77 for the final system pressure (i.e. at the interface to the compressed air network) and an air pressure sensor 78 for the final compression pressure.

A closed inlet valve 71 and open relief valve 72 (idle blow-off valve) result in a negative pressure being present in the compressor chamber of the first compressor stage 2 and also on the suction side 85 of the second compressor stage 3 during idling. As a result, some sealing gas is drawn in from the sealing gas chambers 13*a*, 13*b* via the inner seals 12*a*, 12*b*, which is in any case more advantageous than drawing in any contaminated (usually unfiltered) air from the environment or oil leaks in compressors without sealing gas. Downstream of compressor stages 2 and 3, the compressed air is cooled in a heat exchanger 74 and the condensate produced is separated and discharged via a condensate separator 75. In this way, preferably cooled air with a lower water content can be used to pressurize the sealing gas chambers 13*a*, 13*b* via the sealing gas supply valve 51.

The sealing gas chambers 13*a*, 13*b* are equipped with a negative pressure safety device 46, so that in the event of a vacuum, ambient air can enter the sealing gas chambers 13*a*, 13*b* and a negative pressure in the sealing gas chambers 13*a*, 13*b* is prevented. The negative pressure safety device 46 is designed as a non-return valve that opens towards the sealing gas chamber 13*a*, 13*b*.

The suction-side oil chambers 19*a* of the two compressor stages 2 and 3 are connected to each other via a common gear housing 89. The gear housing 89 accommodates the drive gear 83, which is also oil-lubricated and driven by the drive shaft 90 and which comprises the drive gearwheels connected to the suction-side shaft sections 11*a* for driving the compressor rotors 6. The pressure-side oil chambers 19*b*, in which the synchronizing gears 84 are arranged, are also connected to the common oil chamber 19*a* via connection line 21, in which the oil chamber pressure $p_{OR}$ prevails. Circulating oil lubrication with the oil sump 24, the lubricating oil pump 81 and the lubricating oil lines 80 to the bearings 18*a*, 18*b* and drive gears 83, 84 is also shown. Due to the lower speed, a contacting drive shaft seal 87 can also be used to seal the drive shaft 90 so that no or fewer leaks occur. These leaks can also be specifically drained into a leakage collection device 88 or, optionally, returned to the oil sump 24, wherein the increased oil chamber pressure $p_{OR}$ in the oil sump 24 or oil chamber 19*a* must be taken into account.

FIG. 4 shows a three-stage oil mist separation process. The large oil droplets are pre-separated in a pre-separator 31, e.g. by wire mesh/demister, wherein the separated oil can flow back into the oil chamber by gravity. The oil mist then flows through the fine separator 32, which can be a coalescence filter 32. In this case, the differential pressure across the separator element is so high that the separated oil can no longer return to the oil chamber by gravity with an acceptable height difference during operation. For this purpose, an oil return device in the form of the oil pump 36 and a backflow preventer 38 is provided in the oil return line 34 in order to be able to return the oil to the oil chamber 19*a* even when the compressor 1 is in continuous operation. The oil pump 36 can be designed as a peristaltic pump or vibrating diaphragm pump. The oil pump 36 can be switched on and monitored as required via the fill level sensor 35. By monitoring the filling time and pump-down time, the oil mist separation and oil return can also be monitored for correct functioning. A residual oil separator 33, designed as an adsorption filter 33, e.g. an activated carbon filter, is used as the third cleaning stage. This also adsorbs the remaining residual oil and oil vapor so that clean air is blown out into the environment 9 via the air outlet 37. In the case of process gas compression, the purified gas that escapes can also be fed directly back into the intake of compressor 1.

In exceptional cases, such as emergency venting of the oil chamber 19*a*, 19*b*, the oil mist can also be blown out of the oil chamber 19*a*, 19*b* via a blow-off valve 47, for example in the event of overpressure in the oil chamber 19*a*, 19*b* or in the event of an operating fault (power failure). To prevent too much oil from escaping into the environment 9, the oil mist is pre-cleaned via the pre-separator 31 with a low pressure loss.

FIG. 5 shows a two-stage oil-free compressing compressor 1. Here, the sealing gas chambers are subjected to different sealing gas chamber pressures $p_{SGR}$, namely $p_{SGR1}$ and $p_{SGR2}$. The pressure levels of the sealing gas chambers 13*a*, 13*b* can be adjusted via pressure control valves 52, 53. The pressure control valve 52 is a pressure reducing valve. Two (or more) different pressure levels can be used to optimize the sealing gas flows for the respective operating state. The sealing gas chamber pressures $p_{SGR1}$ and $p_{SGR2}$ recorded by the individual pressure sensors 45*a* and 45*b* are measured in the sealing gas buffer volumes 43 and 44 respectively.

If a liquid should fail in the sealing gas chambers, this can be detected by the level sensor 57 and the condensate can be drained off through the drain valve 56.

Some procedural aspects of the invention, in particular with regard to the control system, are described below.

The pressure sensors 25, 45*a*, 45*b*, the regulatable sealing air supply valve 51, the blow-off valve 47 and the oil pump 36 are connected to the control unit 60, in addition to other sensors such as the air pressure sensors 77, 78 and the fill level sensor 35 as well as the liquid sensor 57, wherein further inputs for recording measurement data from other sensors and outputs for controlling other components, in particular valves, can be provided. The control unit 60 is designed in particular to monitor the oil chamber pressure $p_{OR}$ detected by the sensor 25 and to calculate a differential pressure to the oil chamber pressure $p_{OR}$ based on the sealing gas chamber pressures $p_{SGR}$ or $p_{SGR1}$ and $p_{SGR2}$ detected by the sensors 45 or 45*a* and 45*b*. Based on this differential pressure ($p_{SGR}-p_{OR}$), the control unit 60 controls the sealing gas supply valve 51 or the sealing gas supply valves 51*a*, 51*b*. The control unit 60 can be arranged (locally) on the compressor 1 or connected to the compressor 1 via a (wireless) network connection for its control and regulation. The sealing gas chamber pressure $p_{SGR}$ can be monitored within fixed or dynamic limit values. The control unit 60 can take into account further operating parameters of the compressor, e.g. intake and discharge pressures, speeds or temperatures of the compressor stages, in order to set the sealing gas chamber pressure or pressures for the respective operating state.

The sealing gas supply valve 51 is closed during longer downtimes to prevent unnecessary loss of compressed air.

Shortly before or when the drive of compressor 1 is started, the sealing gas supply valve 51 is already opened in order to pressurize the sealing gas chambers 13*a*, 13*b* with sufficient overpressure.

During operation, the sealing gas chamber pressure $p_{SGR}$ is regulated so that $p_{SGR}$ in the sealing gas chamber 13*a*, 13*b* is always higher than the oil chamber pressure $p_{OR}$ in the oil chamber 19*a*, 19*b*.

During shutdown, the pressure $p_{SGR}$ in the sealing gas chamber 13*a*, 13*b* is slowly reduced by feeding only a small amount of sealing gas via the sealing gas supply line 50 as required. This achieves a uniform pressure reduction both in the sealing gas buffer volumes 43, 44 with the sealing gas chambers 13*a*, 13*b*, but also in the transmission housing 89 with the oil chambers 19*a*, 19*b*. This ensures that the pressure gradient continues to run from the sealing gas chambers 13*a*, 13*b* to the oil chambers 19*a*, 19*b* and not vice versa. A sealing gas flow continues to flow into the oil chamber 19*a*, 19*b*.

LIST OF REFERENCE SIGNS

1 Compressor
2 First compressor stage
3 Second compressor stage
4 Compressor housing
5 Compression chamber
6 Compressor rotor
7 First compressor rotor
8 Second compressor rotor
9 Environment
10*a*, 10*b* Shaft seal arrangement
11*a*, 11*b* Shaft section
12*a*, 12*b* Inner seal
13*a*, 13*b* Outer sealing gas chamber
13*c*, 13*d* Inner sealing gas chamber
14*a*, 14*b* Sealing gap
15*a*, 15*b* Middle seal
16 Rotor bearing
17*a*, 17*b* Outer seal
18*a*, 18*b* Bearing
19*a*, 19*b* Oil chamber
20 Gas discharge line
21 Connection line
23 Oil level
24 Oil sump
25 Pressure sensor (oil chamber pressure $p_{OR}$)
26 Gas outlet
30 Oil separator
31 Pre-separator
32 Fine separator
33 Residual oil separator
34 Oil return line
35 Fill level sensor
36 Oil pump
37 Air outlet
38 Backflow preventer
39 Non-return valve
41 Sealing gas supply duct
42 Sealing gas connection line
43, 44 Sealing gas buffer volume
45 Pressure sensor (sealing gas chamber pressure $p_{SGR}$)
45*a*, 45*b* Pressure sensor (sealing gas chamber pressure $p_{SGR}$)
46 Negative pressure safety device
47 Blow-off valve
48 Sealing gas buffer volume
50 Sealing gas supply line
51 Sealing gas supply valve
51*a* Sealing gas supply valve
51*b* Sealing gas supply valve
52 Pressure control valve
53 Pressure control valve
54 Pressure sensor
55 Sealing gas buffer volume
56 Drain valve
57 Liquid sensor
58 Sealing gas feed
59 Non-return valve
60 Control unit
70 Air inlet
71 Inlet valve
72 Relief valve
73 Non-return valve
74 Heat exchanger (compressed air cooler)
75 Condensate separator
76 Compressed air outlet
77 Air pressure sensor for system end pressure
78 Air pressure sensor for compression end pressure
80 Lubricating oil line
81 Lubricating oil pump
82 Lubricating oil ingress
83 Drive gear
84 Synchronized gear
85 Suction side
86 Pressure side
87 Drive shaft seal
88 Leakage collection device
89 Gear housing
90 Drive shaft

The invention claimed is:

1. A dry-compressing compressor for generating a compressed gas, having one or more compressor stages, comprising a compressor housing, at least one compressor rotor, which is rotatably mounted in relation to the compressor housing via a rotor bearing, wherein the compressor housing comprises a compression chamber for compressing gas drawn in by the compressor rotor and at least one oil chamber, in which at least one oil-lubricated bearing of the rotor bearing for mounting a shaft section of the compressor rotor is accommodated, a shaft seal arrangement assigned to the shaft section, which is arranged between the oil-lubricated bearing and the compression chamber to seal the compression chamber against oil ingress from the oil chamber, wherein the shaft seal arrangement has an outer seal facing the oil-lubricated bearing, in particular without contact, and an inner seal facing the compression chamber, wherein at least one sealing gas chamber for accommodating sealing gas is formed between the outer seal and the inner seal, wherein a sealing gas flows from the sealing gas chamber to the oil chamber and the oil chamber comprises a gas outlet for connection to an oil separator, and wherein the oil chamber is designed to provide an oil chamber pressure $p_{OR}$ which exceeds the ambient pressure $p_0$ of the compressor housing by an oil separation pressure difference $\Delta p$, which is preferably at least 20 mbar, characterized in that the oil separator comprises a plurality of separation stages, wherein the plurality of separation stages comprise an oil mist separator having one or more of a fine separator and a residual oil separator.

2. The dry-compressing compressor according to claim 1, characterized in that the gas outlet of the oil chamber is connected to the at least one oil separator.

3. The dry-compressing compressor according to claim 1, characterized in that the rotor bearing comprises an oil-lubricated suction-side bearing and an oil-lubricated pressure-side bearing, each of which rotatably supports the shaft section of the compressor rotor with respect to the compressor housing, wherein a suction-side shaft seal arrangement is provided for the suction-side bearing and a pressure-side shaft seal arrangement is provided for the pressure-side bearing, wherein the suction-side sealing gas chamber of the suction-side shaft seal arrangement and the pressure-side sealing gas chamber of the pressure-side shaft seal arrangement are connected to one another via a sealing gas connection line.

4. The dry-compressing compressor according to claim 1, characterized in that the shaft seal arrangement additionally has a middle seal between the outer seal and the inner seal, wherein an outer sealing gas chamber (13*a*, 13*b*) for receiving sealing gas is formed between the outer seal and the middle seal and an inner sealing gas chamber for receiving sealing gas is formed between the middle seal (15*a*, 15*b*) and the inner seal.

5. The dry-compressing compressor according to claim 1, characterized in that the compressor has a sealing gas supply by means of which the sealing gas chamber pressure $p_{SGR}$ in at least one sealing gas chamber is variably adjustable.

6. The dry-compressing compressor according to claim 1, characterized in that the compressor has at least one sealing gas buffer volume between a sealing gas feed and a sealing gas chamber.

7. The dry-compressing compressor according to claim 1, characterized in that the compressor comprises at least one pressure sensor for detecting a sealing gas chamber pressure $p_{SGR}$.

8. The dry-compressing compressor according to claim 1, characterized in that a control unit is provided, which is designed to monitor the sealing gas chamber pressure $p_{SGR}$ and/or the oil chamber pressure $p_{OR}$ and/or the differential pressure between the sealing gas chamber pressure $p_{SGR}$ and the oil chamber pressure $p_{OR}$.

9. The dry-compressing compressor according to claim 1, characterized in that a control unit is designed to set the sealing gas chamber pressure $p_{SGR}$ in the sealing gas chamber, such that the sealing gas chamber pressure $p_{SGR}$ is higher than the oil chamber pressure $p_{OR}$ in the oil chamber.

10. The dry-compressing compressor according to claim 1, characterized in that the compressor has a sealing gas supply valve designed as a pressure-reducing valve.

11. A method for oil separation for a dry-compressing compressor having one or more compressor stages for generating a compressed gas according to claim 1, having an oil-lubricated rotor bearing of at least one compressor rotor of the compressor, wherein the method comprises the steps of:

introducing a leakage gas flow, which flows out of a shaft seal arrangement assigned to a shaft section of the compressor rotor, into an oil chamber of a compressor housing of the compressor, in which at least one oil-lubricated bearing of the rotor bearing is accommodated, providing an oil chamber pressure $p_{OR}$ in the oil chamber which exceeds the ambient pressure $p_0$ of the compressor housing by an oil separation pressure difference $\Delta p$, feeding a gas flow from the oil chamber to an oil separator.

12. A dry-compressing compressor for generating a compressed gas, having one or more compressor stages, comprising a compressor housing, at least one compressor rotor, which is rotatably mounted in relation to the compressor housing via a rotor bearing, wherein the compressor housing comprises a compression chamber for compressing gas drawn in by the compressor rotor and at least one oil chamber, in which at least one oil-lubricated bearing of the rotor bearing for mounting a shaft section of the compressor rotor is accommodated, a shaft seal arrangement assigned to the shaft section, which is arranged between the oil-lubricated bearing and the compression chamber to seal the compression chamber against oil ingress from the oil chamber, and has a seal, wherein the oil chamber has at least one gas inlet for a leakage gas flow from the shaft seal arrangement and a gas outlet which is connected to at least one oil separator, wherein the oil chamber is designed to provide an oil chamber pressure $p_{OR}$ which exceeds the ambient pressure po of the compressor housing by an oil separation pressure difference $\Delta p$, which is preferably at least 20 mbar, characterized in that the oil separator comprises a plurality of separation stages, wherein the plurality of separation stages comprise an oil mist separator having one or more of a fine separator and a residual oil separator.

13. The dry-compressing compressor according to claim 12, characterized in that the seal is an outer seal facing the oil-lubricated bearing (18*a*, 18*b*), and the shaft seal arrangement also has an inner seal facing the compression chamber (5), wherein at least one sealing gas chamber for receiving sealing gas is formed between the outer seal and the inner seal (12*a*, 12*b*), wherein the leakage gas flow from the shaft seal arrangement is the sealing gas flow from the sealing gas chamber.

14. The dry-compressing compressor (1) according to claim 12, characterized in that the gas inflow of the oil chamber (19*a*, 19*b*) is formed by at least one sealing gap (14*a*, 14*b*) of the seal (17*a*, 17*b*).

15. The dry-compressing compressor according to claim 12, characterized in that the compressor comprises at least one pressure sensor for detecting the oil chamber pressure $p_{OR}$.

16. The dry-compressing compressor according to claim 12, characterized in that the sealing gas flow and/or the leakage gas flow is an air flow, wherein an air outlet leads downstream of the oil separator into the free environment of the compressor.

17. The dry-compressing compressor according to claim 12, characterized in that the compressor comprises an oil return line for oil separated in the oil separator into the oil chamber, and an oil pump is in the oil return line.

18. The dry-compressing compressor according to claim 12, characterized in that the compressor comprises a blow-off valve for releasing the oil chamber pressure $p_{OR}$ from the oil chamber.

19. The dry-compressing compressor according to claim 12, characterized in that the rotor bearing comprises an oil-lubricated suction-side bearing and an oil-lubricated pressure-side bearing, each of which rotatably supports a shaft section of the compressor rotor with respect to the compressor housing, wherein the compressor housing has a suction-side oil chamber (19*a*), in which the suction-side bearing is accommodated, and a pressure-side oil chamber, in which the pressure-side bearing is accommodated, wherein the suction-side oil chamber and the pressure-side oil chamber are connected to one another.

20. A dry-compressing compressor for generating a compressed gas, having one or more compressor stages, comprising a compressor housing, at least one compressor rotor, which is rotatably mounted in relation to the compressor housing via a rotor bearing, wherein the compressor housing comprises a compression chamber for compressing gas drawn in by the compressor rotor and at least one oil chamber, in which at least one oil-lubricated bearing of the rotor bearing for mounting a shaft section of the compressor rotor is accommodated, a shaft seal arrangement assigned to the shaft section, which is arranged between the oil-lubricated bearing and the compression chamber to seal the compression chamber against oil ingress from the oil chamber, wherein the oil chamber has at least one gas inlet for a leakage gas flow from the shaft seal arrangement and a gas outlet which is connected to at least one oil separator, wherein the oil chamber is designed to provide an oil chamber pressure $p_{OR}$ which exceeds the ambient pressure $p_0$ of the compressor housing by an oil separation pressure difference $\Delta p$, which is preferably at least 20 mbar characterized in that the compressor comprises a blow-off valve for releasing the oil chamber pressure $p_{OR}$ from the oil chamber.

* * * * *